D. LOUDENSLAGER.
MARKER FOR CORN PLANTERS.
APPLICATION FILED NOV. 18, 1908.
910,831.
Patented Jan. 26, 1909.
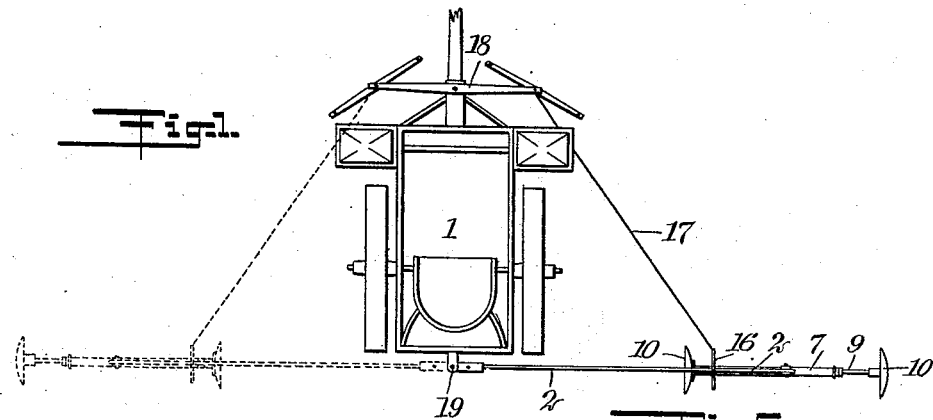
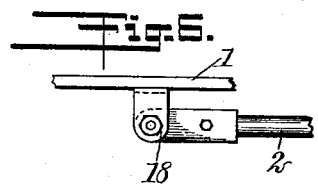
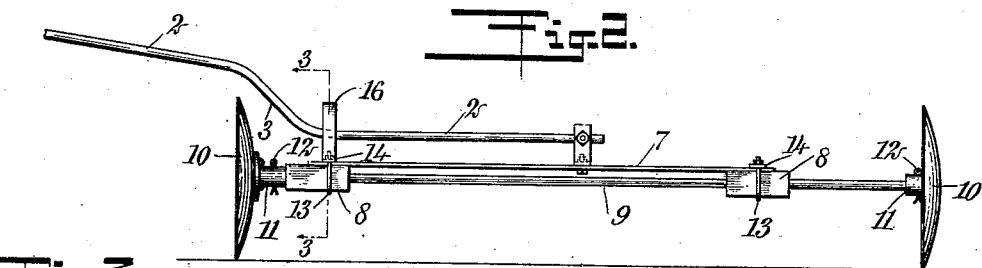
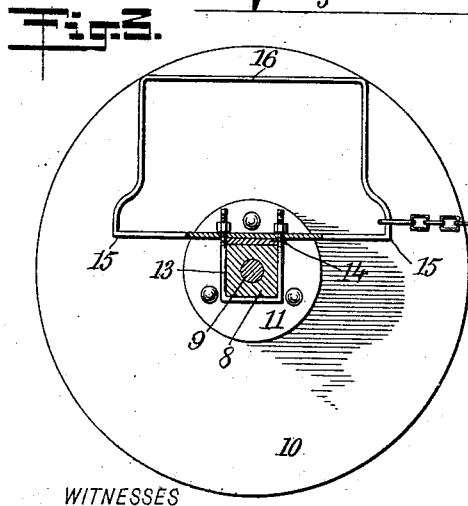
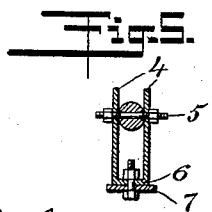
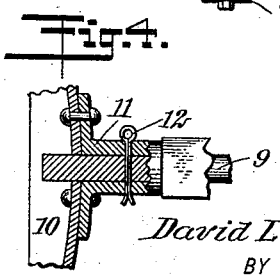
WITNESSES
INVENTOR
David Loudenslager
BY
ATTORNEYS

UNITED STATES PATENT OFFICE.

DAVID LOUDENSLAGER, OF RISING CITY, NEBRASKA.

MARKER FOR CORN-PLANTERS.

No. 910,831.　　　Specification of Letters Patent.　　　Patented Jan. 26, 1909.

Application filed November 18, 1908. Serial No. 463,183.

*To all whom it may concern:*

Be it known that I, DAVID LOUDENSLAGER, a citizen of the United States, and a resident of Rising City, in the county of Butler and State of Nebraska, have invented new and useful Improvements in Markers for Corn-Planters, of which the following is a full, clear, and exact description.

My invention relates to corn planters, and has for its object to provide a double row marker which may be readily adjusted to corn planters now on the market, the disks of the marker being adjustable so that they may be spaced apart to correspond with the width of the corn planter. By the use of my marker the operator is enabled to keep the rows straight and equal distances apart.

Still other objects of the invention appear in the following complete description.

In this specification I will describe the preferred form of my invention, but it will be understood that I do not limit myself thereto, as I consider myself entitled to all forms and embodiments of the invention which may be held to fall within the scope of the appended claims.

Reference is to be had to the accompanying drawings, forming a part of this specification, in which similar characters of reference indicate corresponding parts in all the figures, in which—

Figure 1 is a plan view showing my marker applied to a corn planter; Fig. 2 is a rear elevation of my marker; Fig. 3 is a sectional view on the line 3—3 of Fig. 2; Fig. 4 is a fragmentary sectional view showing the manner in which the disks are secured to the axle; Fig. 5 is a fragmentary sectional view showing the manner in which the support for the bearings is pivoted to the support for the axle; and Fig. 6 is a fragmentary view showing the manner in which the support for the marker is pivoted to a planter.

By referring to the drawings, it will be seen that the planter 1 is of the ordinary type, and to its frame, at the rear, is pivoted a support 2, the support 2 being adapted to be disposed laterally at either side of the planter. The support 2 is curved downwardly as well as outwardly, and at a short distance from its terminal it is curved at 3, still further downwardly and then is extended substantially horizontally with reference to the ground. Near the end of the support 2, vertical members 4 of an angle iron are pivoted to it, by means of a bolt 5. The horizontal portion 6 of this angle iron is pivoted to a support 7 for the bearings 8. It will therefore be seen that the support 7 for the bearings is so connected with the support 2, that it is adapted to be rotated slightly not only horizontally but vertically with reference thereto.

In the bearings 8 is journaled an axle 9, and disposed on this axle are disks 10, the disks 10 being preferably concavo-convex in shape. To the disks 10 are secured collars 11, the collars extending along the axle 9, and through which there is an orifice corresponding with orifices spaced apart on the axle 9, the collars 11 being secured to the axle 9 by means of cotter pins 12. It is in this way possible to adjust the disks 10 on the axle 9 relatively to each other, as well as relatively to the planter 1.

The bearings 8 are secured to the bearing support 7 by means of the straps 13, there being plates 14 which are disposed on the bearing support 7, the straps 13 being bolted to the said plates 14. One of the plates 14 is extended forwardly and rearwardly, as at 15, and is then disposed upwardly, and is united at its top as shown at 16. By this means a hollow frame is provided, through which the support 2 is disposed. To this frame 16 is secured a chain 17, the other terminal of the chain being adapted to be secured to a swingletree 18 of the planter 1.

In using my invention, the support 2 is pivoted to the planter 1 at 19 and it is disposed laterally with reference thereto, the construction permitting the marker to be disposed on either side of the planter. After the marker has been adjusted, the disks 10 are adjusted on the axle 9, so that they will be separated one from the other a distance corresponding with the width of the planter. The chain 17 which is secured to the frame 16 at one terminal, is then connected with the swingletree 18 and the marker is ready for operation. By means of the pivotal connection between the support 7 for the bearings and the support 2, the marker is adapted to travel over uneven ground, while still preserving the alinement, and by means of the chain 17 any change in direction of the planter will be communicated to the marker, so that at all times the marker will follow along evenly, and without any effort on the part of the operator, the marker will preserve straight lines which are in alinement with each other and with the planter. In the operation of the marker, it is customary for the operator to have the horses follow the marks previously made, and when the disks are suitably adjusted with reference to each other and to the marker, the marks will be found to be equal distances apart after the field has been traversed.

Having thus described my invention, I claim as new and desire to secure by Letters Patent:

1. In a marker for corn planters, a support adapted to be secured to a planter, bearings secured to the support, an axle journaled in the bearings, a plurality of disks secured to the axle, and means by which the support may be connected with the swingletree of a planter.

2. In a marker for corn planters, a support adapted to be secured to a planter, bearings, a support for the bearings, the support for the bearings being secured to the first named support, an axle journaled in the bearings, a disk secured to the axle, and means by which the support for the bearings may be connected with the swingletree of a planter.

3. In a marker for corn planters, a support adapted to be secured to a planter, bearings, a support for the bearings, means by which the support for the bearings is connected pivotally to the first named support, a frame secured to one of the bearings, the first named support being disposed in the frame, and means for connecting the frame to the swingletree of a planter.

4. In a marker for corn planters, a support adapted to be secured to a planter, bearings, a support for the bearings, means by which the support for the bearings is connected pivotally to the first named support, an axle journaled in the bearings, an adjustable disk disposed on the axle, means for securing the disk to the axle, and means for connecting the support with the swingletree of a planter.

5. A planter, a support pivoted thereto, bearings, a support for the bearings, the support for the bearings being secured to the first named bearings, an axle journaled in the bearings, disks secured to the axle, and means by which the support for the bearings may be connected with the swingletree of the planter.

6. A planter, a support pivoted at the rear of the planter and which is adapted to be disposed at either side thereof, bearings, a support for the bearings, means by which the support for the bearings is connected pivotally to the first named support, a frame secured to one of the bearings, the first named support being disposed in the frame, and means for connecting the frame with the swingletree of the planter.

In testimony whereof I have signed my name to this specification in the presence of two subscribing witnesses.

DAVID LOUDENSLAGER.

Witnesses:
G. W. DAY,
S. A. REICHENBACH.